I. Varney,
Lifting Jack,
Nº 70,763.  Patented Nov. 12, 1867.
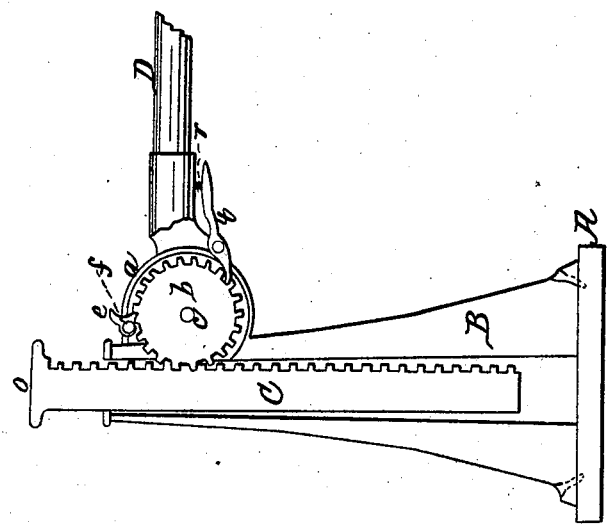
Witnesses.
William H. Clifford
J. M. Frank Leavey
Inventor.
Isaac Varney

United States Patent Office.

ISAAC VARNEY, OF KENNEBUNK, MAINE.

Letters Patent No. 70,763, dated November 12, 1867.

IMPROVEMENT IN CARRIAGE-JACK.

*The Schedule referred to in these Letters Patent and making part of the same.*

TO ALL WHOM IT MAY CONCERN:

Be it known that I, ISAAC VARNEY, of Kennebunk, in the county of York, and State of Maine, have invented a new and useful improved Carriage-Jack; and I hereby declare the following to be a full, clear, and exact description thereof, which will enable others to make and use my invention, reference being had to the accompanying drawings, forming part of this specification, in which is shown a side sectional elevation of my invention, which exhibits the different parts or devices by which the machine is operated.

A shows the base upon which the device rests, and to which it is secured by screws. B is a tube or cylinder, with a hollow or hole in the centre to receive the toothed arm C, which arm moves easily up or down in the hollow of the upright tube or envelope. *a* is a projecting casing from one side of the tube, which projection receives the geared wheel *b* which turns on an axis, *o*, fixed in and passing through the sides of the projecting casing *a*. The geared wheel *b* matches into the teeth on the arm *e*, as illustrated. D is an arm or lever, bifurcated at one end, so as to pass over the outside of the projecting casing *a* of the wheel *b*. The two ends of this lever D are attached to the same pivot, *c*, as the wheel *b*. On the upper edge of the casing *a* is a small aperture to receive the small pawl *e* hung on the pin *f*. This pawl is to prevent the wheel *b* from turning in such a direction as to allow the toothed arm or slide to run downwards; in other words, so to hold the arm as to enable it to sustain the weight resting upon it at *o*. This pawl may, however, be lifted out of the ratchet or gear *b* at pleasure, when the wheel quickly revolving will let the toothed sliding arm sink down into the hole in the cylinder B. This pawl has its axis or pivot in the side of the casing *a*. On the under side of the lever D is another pawl, *t*, having the spring *r*, which spring keeps the pawl always pressed into the teeth of the gear *b*. By the aid of this pawl, as the lever D is pressed downward, the wheel *b* is so turned as to raise the slide C and the weight resting thereon. At each elevation of the slide C the pawl *e* holds it at the point to which it has been raised. Press upward on the pawl *t*, and toward the cylinder on the pawl *e*, and the geared wheel *b*, being thus relieved, will quickly revolve and allow the toothed slide C to drop into the hole in the cylinder. The cylinder is made by casting, as well as the slide and gear.

I do not claim any of the separate parts by themselves, or in any arrangement but the one herein set forth for the specified purposes.

I do not claim a lever-jack consisting of a frame, with a rack-bar placed therein, and operated by means of a wheel and lever, as set forth in the rejected application of J. G. Kindleberger, August 17, 1867, but my invention relates to a convenient and novel arrangement of the devices described in this specification. The arrangement of the two pawls *t e* is different from the case of Kindleberger.

What I claim as my invention, and desire to secure by Letters Patent, is—

The arrangement and combination of the arm D, toothed slide C, gear *b*, casing *a*, centrally-pivoted pawl *e*, and spring-pawl *t r* on the hollow cylinder B, substantially as and for the purposes set forth.

ISAAC VARNEY.

Witnesses:
   WILLIAM H. CLIFFORD,
   WM. TRANK SEAVEY.